Oct. 8, 1968  E. R. CARTER, JR., ET AL  3,404,897
SOCKET CAP SCREW WITH CROSS HOLES
Original Filed April 29, 1963  2 Sheets-Sheet 1

Oct. 8, 1968  E. R. CARTER, JR., ET AL  3,404,897
SOCKET CAP SCREW WITH CROSS HOLES
Original Filed April 29, 1963  2 Sheets-Sheet 2

INVENTORS
EARLE RUSSELL CARTER, JR.
EDMUND WEST
BY
Stephen J. Rudy
ATTORNEY

United States Patent Office 3,404,897
Patented Oct. 8, 1968

3,404,897
SOCKET CAP SCREW WITH CROSS HOLES
Earle Russell Carter, Jr., Bloomfield, and Edmund West, Glastonbury, Conn., assignors to The Allen Manufacturing Company, Hartford, Conn., a corporation of Delaware
Original application Apr. 29, 1963, Ser. No. 276,545, now Patent No. 3,204,266, dated Sept. 7, 1965. Divided and this application July 16, 1965, Ser. No. 472,471
2 Claims. (Cl. 279—50)

This application is a division of a parent application Ser. No. 276,545, filed Apr. 29, 1963, now Patent No. 3,204,266 granted Sept. 7, 1965.

It is directed to a collet chuck assembly designed especially for supporting a cap screw to facilitate the forming of radial cross holes in the head of the screw.

A feature of the chuck assembly is a collet having jaws which are perforated in a region which grips the socket head of the cap screw, permits access of drills and punches to form the radial holes in the head of the screw, and centralizes the drills and punches in a common plane for this purpose.

Figure 1:
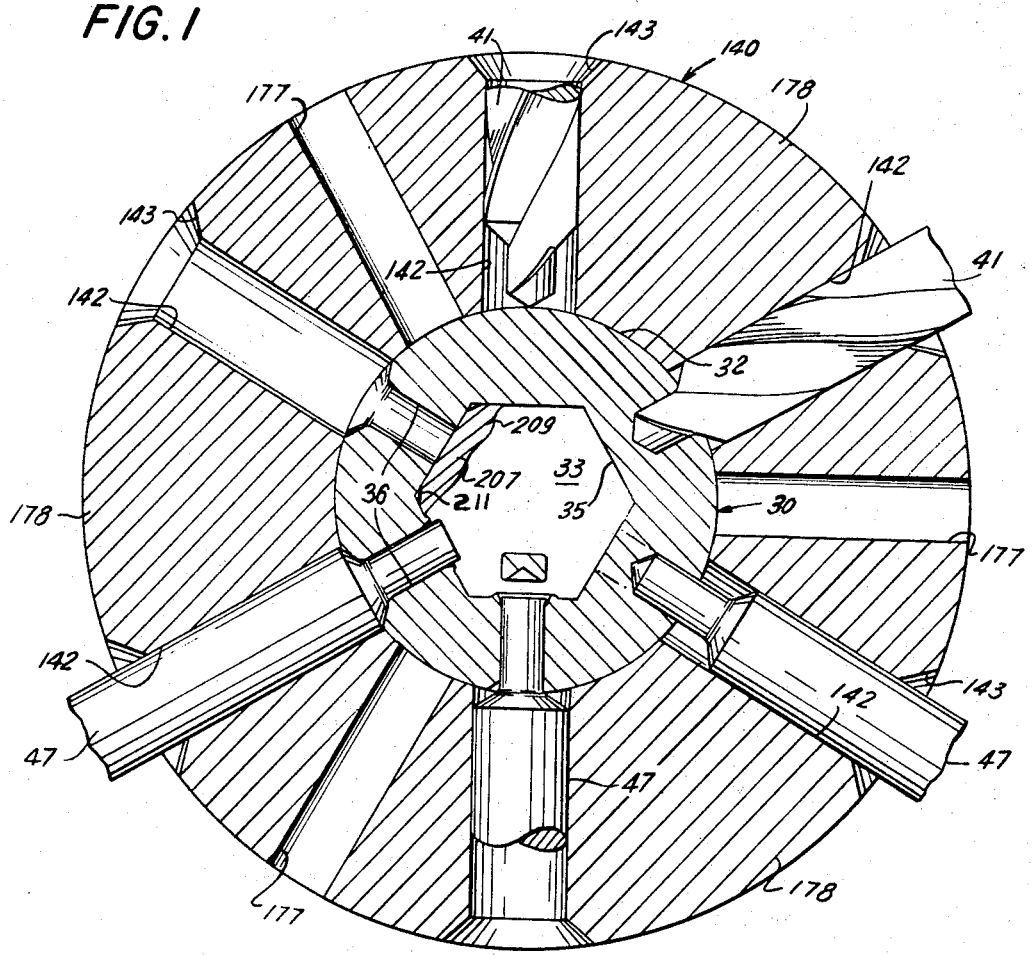
FIG. 1 is a section taken on line 1—1 of FIG. 2; it shows a blank socket head of a cap screw gripped in the jaws of a collet, and it shows each of the apertures of the collet as accommodating a hole forming tool in the process of forming cross holes in the head of the cap screw.

Referring to the drawings, there is shown a form of cap screw 30 for which the collet chuck assembly is especially adapted. The cap screw 30 has the usual threaded shank 31 to which is integrally attached a cylindrical head 32. The head has a socket 33 having the shape of a regular hexagonal prism and is adapted to receive the usual hex key (not shown) by means of which the screw may be driven. The socket is divided into six sectors, each having a flat face 35, defining the periphery of the socket. One or more of the pairs of opposite wall sectors are intended to be provided with aligned cross holes 36 for the reception of the usual locking tie-wire. These holes are formed by suitable hole forming tools such as a drill 41 followed by a punch 47.

A collet chuck assembly 186 (FIGS. 3 and 4) is provided to support the cap screw during the process of forming the cross holes. A principal feature of the chuck assembly is a steel collet 140.

Figure 2:
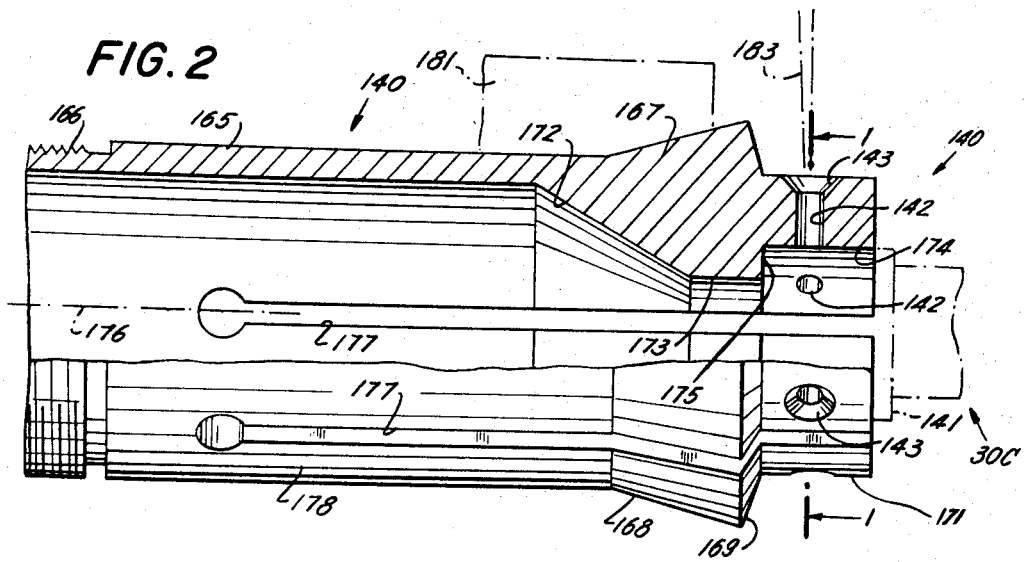
FIG. 2 is a detail of the collet partly broken away showing the jaws of the collet as having been contracted from a normally open condition.

Referring to FIG. 2, the steel collet 140 is constructed in one piece and is hollow from end to end. It comprises for the major portion of its length a cylindrical portion 165, the rear end of which is provided with external screw threads 166 by means of which the collet may be supported in a stationary position. The annular wall of the collet is relatively thin along the cylindrical portion 165 but is enlarged to form a head 167 at the front end of the collet. At its periphery, the head has a forwardly diverging frusto-conical surface 168, a converging surface 169 and a reduced cylindrical surface 171. Internally, the head has a surface 172 tapering forwardly toward a bore 173 leading to a counterbore 174, the bore and counterbore being separated by a shoulder 175 in a plane transverse to the collet axis 176. In order to impart resilience to the collet, the latter is provided with radial kerfs 177 each extending from the front extremity of the collet, through the head 167 and throughout most of the length of the cylindrical portion 165. As shown in FIG. 1, there are three kerfs circumferentially spaced 120° apart, which divide the collet 140 into three sectors or jaws 178. Extending outwardly from the counterbore 174 to the peripheral surface 171 are six radial aperatures 142 countersunk at their ends 143. As seen in FIG. 1 in a clamped condition of the collet about the head of a cap screw, the axes of all the aperatures are located in a common plane perpendicular to the collet axis 176 and are uniformly spaced 60° apart. Each jaw 178 has two apertures, each located 30° from the center line of the adjacent kerf 177.

Figure 3:
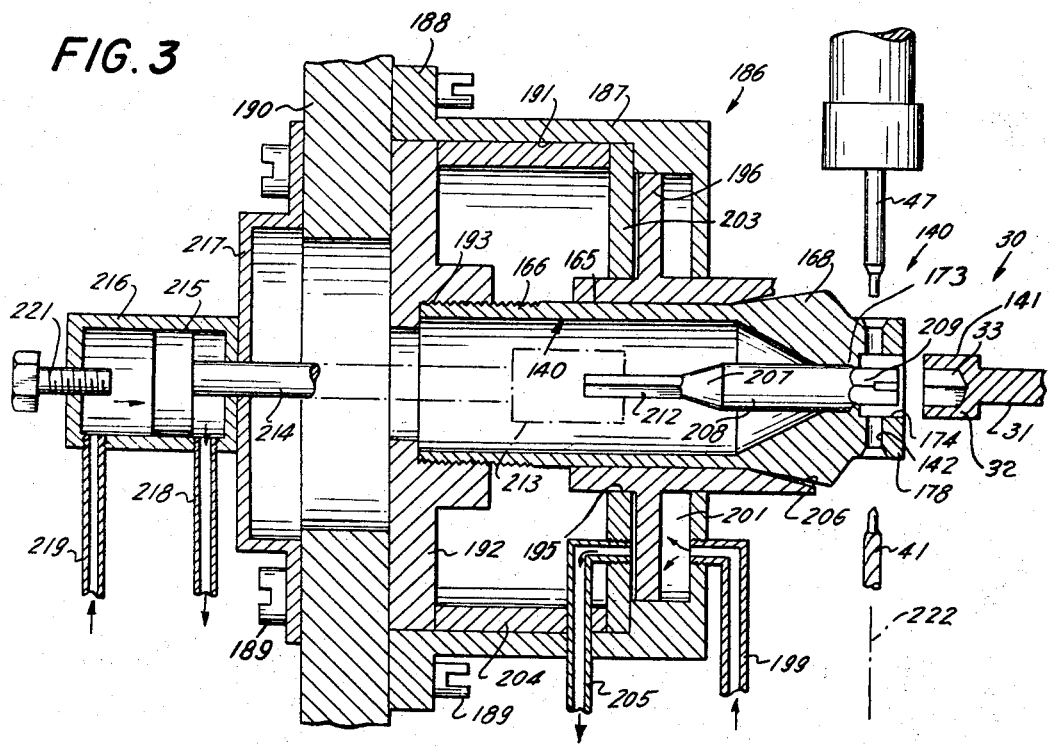
FIG. 3 is ta longitudinal section of the collet chuck assembly, preparatory to reception of the blank socket head of a cap screw for forming the cross holes in the head.

Referring to FIGS. 2 and 3, one of the functions of the collet 140 is to support the blank head of the cap screw or workpiece 30 with the rear extremity of the workpiece head seated against the counterbore shoulder 175 and with the cylindrical periphery 141 of the workpiece head snugly embraced by the cylindrical counterbore 174 in the sectors 178 whereby the axis of the workpiece 30 is aligned with the axis 176 of the collet. In order to close the collet on the workpiece, the threaded portion 166 is held against axial movement while the forwardly diverging peripheral surface 168 is cammed inwardly by the action of a cam sleeve 181 which has a complementary internal taper and which is subjected to a forward thrust. In the closed position of the collet as shown in FIG. 2, the counterbore shoulder 175 lies in a plane perpendicular to the collet axis 176, the radial axes of apertures 142 also lie in a perpendicular plane, and the counterbore sectors 174 are cylindrical. When the cam sleeve 181 is removed, however, the sector jaws 178 expand, causing the counterbore 174 to diverge forwardly and to move the shoulder 175 slightly away from a perpendicular plane. At the same time, the axis of each aperture 142 is swung away from the original perpendicular plane, represented by the section line 1—1 of FIG. 2, and is shifted to an oblique position represented by the center line 183. Moreover, the expansion of the collet jaws 178 shifts the axes of the apertures 142 in a circumferential sense so that they are no longer precisely radial or uniformly spaced. However, the apertures 142 are properly spaced and extend in a common perpendicular plane when the workpiece 30 is gripped therein.

Figure 4:
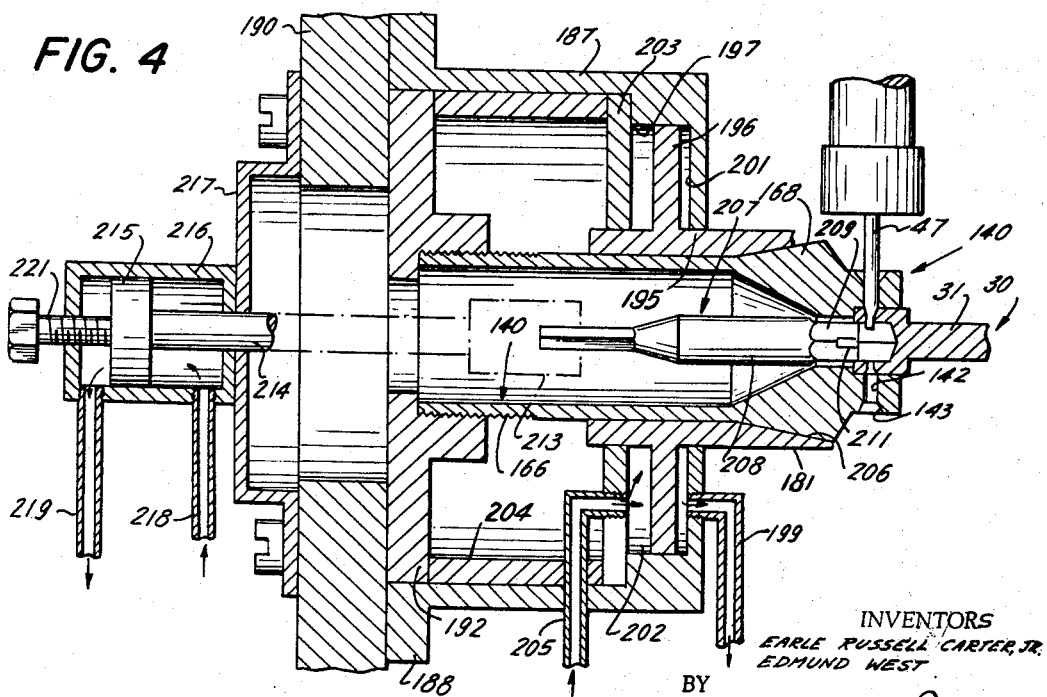
FIG. 4 is a view similar to FIG. 3 but showing the head of the cap screw gripped in the jaws of the collet and showing a hole-punch in operation.

In use, the collet 140 forms part of a chuck assembly 186 shown schematically in FIGS. 3 and 4. The assembly includes a chuck body 187 having at its rear end an annular flange 188 secured by cap screws 189 to any suitable fixture such as a vertical wall 190. The body has a large counterbore 191 which encircles and centers a back head 192 provided with a threaded opening 193 engageable with the threaded end 166 of the collet 140 to provide a rigid support for the collet. The front end of the collet is provided with means for supporting it relative to the chuck body on an axis perpendicular to the vertical wall 190. The supporting and centralizing means, as shown, comprises a sleeve 181 slidably fitting the cylindrical portion 165 of the collet and also slidably fitting a small bore 195 in the front wall of the chuck body 187. The sleeve 181 is connected to a piston head 196 operable in an intermediate bore 197 to effect closing and opening of the collet jaws. A hose line 199 admits live air to the expansible chamber 201 in front of the piston head 196. Another expansible chamber 202 is provided between the piston head 196 and a plate 203 in which the reciprocating sleeve 181 has a sliding fit. The plate 203 is seated against the shoulder at the front end of the large counterbore 191 and is maintained in seated condition by a spacer cylinder 204 interposed between the plate and the backhead 192. A rear hose line 205 supplies live air to the rear expansible chamber 202. Suitable valve means (not shown) under semi-automatic control alternately supply live air to one hose line while exhausting the other thereby effecting reciprocation of the sleeve 181. In front of its cylindrical bore, the sleeve 181 has a forwardly diverging frusto-conical surface 206 engageable with the tapered surface 168 of the collet 140. When live air is admitted to the front hose line 199 and vented from the rear hose line 205, as shown in FIG. 3, the reciprocating sleeve 181 is shifted rearward to disengage the tapered surface 168 on the collet and permit the front end thereof to expand radially in response to the inherent resilience or springiness of the collet jaws 178.

In the wide open position of the collet, which is the normal unstressed condition, the counterbore 174 is enlarged to a size which will permit the head of the workpiece 30 to be inserted freely. On the other hand, when live air is admitted to the rear hose line 205 and vented from the front hose line 199, the reciprocating sleeve 181 is shifted forward to cause the frusto-conical surface 206 to exert a camming force on the collet jaws whereby the collet counterbore 174 firmly grips the cylindrical periphery 141 of the workpiece, as in FIG. 4.

When the workpiece or socket head cap screw 30 is first inserted in the counterbore 174, it is indexed to move the flat faces of the socket to a position at right angles with the associated collet apertures 142. In order to facilitate such indexing motion and also for other purposes, the chuck assembly 186 is provided with a hex key 207 mounted at the center of the collet 140 for axial reciprocation. The hex key has a cylindrical body 208 slidably fitting the collet core 173. In front of the cylindrical body is a hexagonal portion 209. The latter fits the six walls of the workpiece socket 33 and, for the major portion of its length, has the cross sectional shape of a regular hexagon with sharp corners. Near the front end of the hexagonal portion 209, the corners are provided with a chamfer 211 (FIG. 4) which facilitates centering of the socket 33 on the hex key 207.

Extending rearwardly from the cylindrical body 208, the hex key 207 has a shank 212 received within a key holder 213 which is connected to a rod 214 which extends rearward through the back head 192 and vertical wall 190. At its rear end, rod 214 is connected to a piston 215 mounted in a cylinder 216 supported by a bracket 217 attached to the rear face of the vertical wall 190. The cylinder 216 is provided with hose lines 218 and 219 for alternately supplying live air to one end of the cylinder while venting the other thereby to reciprocate the piston 215 and with it the hex key 207. The rearward position of the hex key is controlled by a screw 221 threaded into the rear wall of the cylinder 216 and providing an adjustable limit stop engageable with the rear extremity of the piston 215.

Each of the collet apertures 142 registers with a drill 41 and/or with a punch 47, the axes of which are disposed in a common vertical plane 222 perpendicular to the collet axis 174 and therefore parallel to the vertical wall 190. In a commercial embodiment of this invention, there are six drills movable radially in unison during the early stages of operation, and six punches movable radially in unison during the later stages of operation, the latter being arranged to be swung (by shifting means not shown) out of the respective paths of the drills during the early stages. The number of drills and punches in actual use depends upon the requirements of the purchaser and may be reduced to four or two of each, if the purchase order calls for two pairs or one pair of cross holes.

Preferably, the small bore 173 (FIG. 2) in the collet 140 has a diameter substantially equal to that of the cylindrical body 208 of the hex key 207 whereby the key, at least in the FIG. 3 position, is supported co-axially with the collet bore 174 and therefore in proper position to fit the socket 33 of the workpiece 30. In the rearward position of the hex key (FIG. 4) the cylindrical portion 208 lies just to the rear of the collet bore 173 and the front end of the hex key is supported by the socket 33 in the workpiece. Upon subsequent removal of the workpiece and forward movement of the hex key 207, the front end of the cylindrical portion 208 engages the tapered surface 172 of the collet which acts to centralize the hex key and guide it for movement into the small bore 173.

Suitable controls (not shown) are provided for operation of the pistons 196 and 215.

What is claimed is:

1. A tubular collet for holding the cylindrical head of a multi-walled socket-head screw so as to permit tie-wire holes to be drilled transversely of the head at a specific location, comprising a rear portion adapted for attachment to a chuck body, a group of longitudinally extending resilient segmental jaws defining axially of their combined front end an annular recess adapted to receive the cylindrical head of a socket-head screw, the recess having an annular shoulder at its bottom as a seat for the head of the screw, the jaws adapted upon being pressed radially inward to clamp the head of the screw fast after it has been seated in the recess, the wall of the recess having radial drill guide holes countersunk at their outer ends adapted for reception of drill means for drilling tie-wire holes at a specific location transversely of the head of a screw that might be seated and clamped in the recess, there being an indexing means guide opening extending axially of the shoulder communicating the recess with the interior of the collet, and indexing means adapted for sliding axial movement through the opening so as to engage in the socket of the head of a screw that might be seated in the recess, but not as yet clamped in the recess, to locate in a specific position the walls of the socket relative to the drill guide holes.

2. A tubular collet as in claim 1, wherein each jaw segment has two of said guide holes spaced circumferentially 60 degrees apart.

References Cited

UNITED STATES PATENTS

| | | | |
|---|---|---|---|
| 516,645 | 3/1894 | Feldt | 279—51 |
| 2,479,405 | 8/1949 | Ramsey | 279—1 X |

ROBERT C. RIORDON, *Primary Examiner.*